(12) United States Patent
Miura et al.

(10) Patent No.: US 8,490,334 B2
(45) Date of Patent: Jul. 23, 2013

(54) GLASS RUN

(75) Inventors: Yoshihiro Miura, Kiyosu (JP); Yuki Ichinoo, Toyota (JP); Toru Okamoto, Okazaki (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 13/316,311

(22) Filed: Dec. 9, 2011

(65) Prior Publication Data
US 2012/0151842 A1 Jun. 21, 2012

(30) Foreign Application Priority Data
Dec. 21, 2010 (JP) .................................. 2010-284732

(51) Int. Cl.
*E06B 7/16* (2006.01)
(52) U.S. Cl.
USPC ........................................... 49/479.1; 49/441
(58) Field of Classification Search
USPC .................. 49/475.1, 479.1, 440, 441, 495.1
See application file for complete search history.

(56) References Cited

U.S. PATENT DOCUMENTS

| 4,817,336 | A | * | 4/1989 | Kisanuki | 49/476.1 |
| 4,977,706 | A | * | 12/1990 | Kisanuki | 49/479.1 |
| 5,839,232 | A | * | 11/1998 | Backes et al. | 49/479.1 |
| 6,237,287 | B1 | * | 5/2001 | Nakagawa et al. | 49/479.1 |
| 6,240,677 | B1 | * | 6/2001 | Baumann | 49/479.1 |
| 6,725,605 | B2 | * | 4/2004 | Schlachter et al. | 49/479.1 |
| 8,051,606 | B2 | * | 11/2011 | Maaβ et al. | 49/479.1 |
| 2002/0139054 | A1 | * | 10/2002 | Schlachter et al. | 49/479.1 |
| 2004/0177562 | A1 | * | 9/2004 | Deguchi et al. | 49/479.1 |

FOREIGN PATENT DOCUMENTS

| JP | 63078812 A | * | 4/1988 |
| JP | 09-150634 A | | 6/1997 |
| JP | 2002-264661 A | | 9/2002 |
| JP | 2002-283852 A | | 10/2002 |
| JP | 2003-146084 A | | 5/2003 |

* cited by examiner

*Primary Examiner* — Jerry Redman
(74) *Attorney, Agent, or Firm* — McGinn IP Law Group, PLLC

(57) ABSTRACT

A glass run includes an upper side portion, a front vertical portion, a rear vertical portion, a front corner portion, a rear corner portion and an ornamental molding portion. An upper end of the molding portion is integrally jointed to the rear corner portion, and a lower end of the ornamental molding portion extends obliquely so as to be positioned frontwardly of the rear corner portion. The ornamental molding portion includes a base part and an ornamental lip part. The base part and the ornamental lip part hold a tip end of an outer panel of the door frame. The ornamental lip part is formed such that an upper end thereof is formed continuously with an outer cover lip of the rear corner portion, and a lower end thereof contacts an outer weather strip.

13 Claims, 12 Drawing Sheets

FIG. 5 (a) PRIOR ART
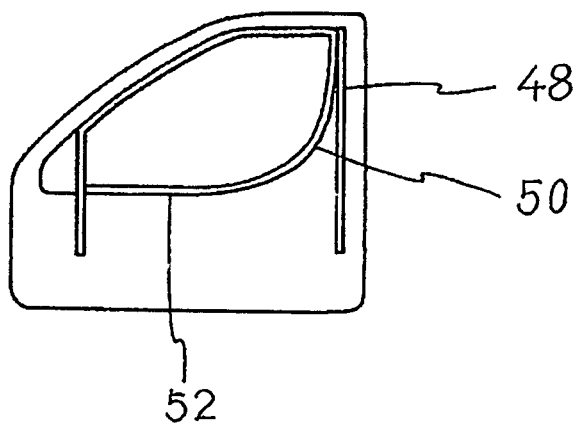
FIG. 5 (b) PRIOR ART
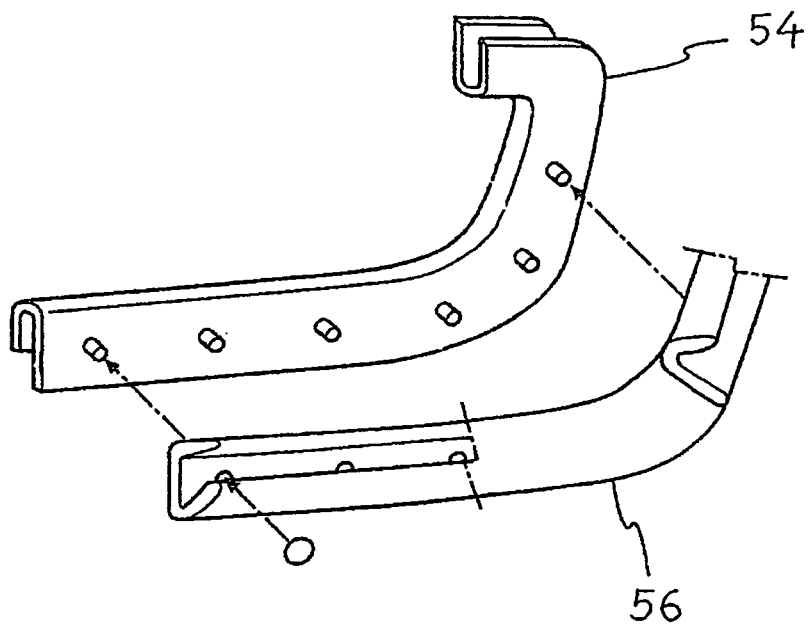

GLASS RUN

CROSS-REFERENCE TO RELATED APPLICATION

This application is related to and claims priority from Japanese patent Application No. 2010-284732 incorporated herein by reference.

BACKGROUND OF THE INVENTION

1. Field of the Invention

The present invention relates to a glass run adapted to be attached to an inner periphery of a door frame of a motor vehicle to provide a seal between the door frame and a door glass.

2. Description of Related Art

As shown in FIG. 1, door frames 10a, 10b are respectively provided in a front door 12a and a rear door 12b on an upper side of a belt line thereof. In the rear door 12b, a division bar 14 extends from a lower surface of an upper side portion of the door frame 10b on the rear side thereof. A quarter door glass 16 is secured on the rear side of the division bar 14. A glass run 22b is attached to the door frame 10b and the division bar 14 on the front side thereof, and a door glass 18 is mounted in the glass run 22b so as to be raised and lowered therealong.

A quarter weather strip 20 is attached along the quarter door glass 16 to seal the quarter door glass 16 against the door frame 10b and the division bar 14. And the glass run 22b attached to the door frame 10b and the division bar 14 seal the door glass 18 against the door frame 10b and the division bar 14.

With this arrangement, the quarter door glass 16, the quarter weather strip 20 and the division bar 14 are needed, thereby increasing the production costs and the vehicle weight.

Under the above circumstances, it has been proposed to remove the division bar 14. In this case, as shown in FIG. 2, in order to improve the designability around the door glass, an ornamental molding portion 24 is formed integrally with an outer cover lip 26 of a rear vertical portion 28 of a glass run 30 so as to protrude obliquely frontwardly.

With this arrangement, in order to form the rear vertical portion 28 and the ornamental molding portion 24, a large-sized integrally molding device is required. With this device, the arrangement of a mold becomes complex to increase the production costs thereof, and the molding time becomes long to lower the productivity. In addition, since the rear vertical portion 28 and the ornamental molding portion 24 are integrally formed, they cannot flex at different angles, respectively, upon attaching them to the door frame 10b. As a result, preferable flexibility of the glass run 30 is not obtained, whereby it takes much time to attach the same to the door frame 10b.

FIG. 3 shows another glass run 32 for a vehicle door, in which a rear vertical portion 32 and an ornamental molding portion 36 extend from a rear corner 38 obliquely frontwardly (see Japanese patent application laid-open No. 2002-264661, for example). In this case, the ornamental molding portion 36 is integrally formed with the rear vertical portion 32 so that the production costs may increase, and the assembly efficiency may lower.

FIG. 4 shows still another glass run 40 for a vehicle door, in which an outer cover lip is cut off in a joint between a rear vertical portion 42 and an outer weather strip 44, and then, a molded outer cover lip 46 is formed integrally with the outer weather strip 44 (see Japanese patent application laid-open No. Hei 9-150634, for example). In this case, a corner portion jointed to the outer weather strip 44 merely joints the outer cover lip 46 of the rear vertical portion 42 to the outer weather strip 44 so that such an ornamental molding portion as to partly cover the door glass is not provided.

And, FIG. 5 shows a further glass run 48 for a vehicle door, in which a rear vertical portion 50 is formed obliquely frontwardly in a joint to an outer weather strip 52 (see Japanese patent application laid-open No. 2002-283852, for example).

This glass run 48 is produced by forming an attaching portion (molding portion) 54 of a synthetic resin, and a glass seal lip 56 of a rubber like elastic body separately from each other, and joining them to each other. Therefore, upon attaching the glass run 48 to a door frame, it takes time to form and assemble the attaching portion (molding portion) 54 and the glass seal lip 56.

SUMMARY OF THE INVENTION

It is an object of the present invention to provide a glass run exhibiting good moldability and excellent assembling properties, and having an ornamental molding portion which extends obliquely frontwardly from a rear corner thereof.

In order to achieve the above-described object, according to a first aspect of the present invention, a glass run for use in a motor vehicle, which is adapted to be attached along an inner periphery of a door frame of a vehicle door for providing a seal between the door frame and a door glass, includes an upper side portion which is formed by extrusion and adapted to be attached to an upper side of the door frame, a front vertical portion which is formed by extrusion and adapted to be attached to a front vertical side of the door frame, a rear vertical portion which is formed by extrusion and adapted to be attached to a rear vertical side of the door frame, a front corner portion which is formed by molding to join the upper side portion and the front vertical portion to each other, a rear corner portion which is formed by molding to join the upper side portion and the rear vertical portion to each other; and an ornamental molding portion which is formed by molding and is provided to extend from the rear corner portion towards an outer weather strip attached along a belt line of the vehicle door for attachment on an exterior side of the door glass.

The front vertical portion, the upper side portion, the front corner portion, the rear corner portion and the rear vertical portion respectively include an outer side wall, a bottom wall, and inner side wall, and define a generally U-shaped cross-section. An outer seal lip extends from an open end of the outer side wall so as to obliquely project in an interior defined by the outer side wall, the inner side wall and the bottom wall, an inner seal lip extends from an open end of the inner side wall so as to obliquely project in an interior defined by the outer side wall, the inner side wall and the bottom wall, whereby the door glass slides between the outer seal lip and the inner seal lip. An outer cover lip and an inner cover lip are provided so as to extend from the open end of the outer side wall and the open end of the inner side wall along exterior surfaces thereof.

An upper end of the ornamental molding portion is integrally jointed to the rear corner portion during the forming thereof, and a lower part of the ornamental molding portion is tilted so as to be positioned frontwardly of the rear vertical portion. The ornamental molding portion includes a base part for attachment to an outer panel of the door frame, and an ornamental lip part is integrally formed with a front side edge of the base part to extend along the base part, the base part and the ornamental lip part hold a tip end of an outer panel of the door frame, the ornamental lip part is formed such that an upper end thereof is formed continuously with the outer cover lip of the rear corner portion, and a lower end thereof contacts the outer weather strip.

With the arrangement, the glass run includes an upper side portion which is formed by extrusion and adapted to be attached to an upper side of the door frame, a front vertical portion which is formed by extrusion and adapted to be attached to a front vertical side of the door frame, a rear vertical portion which is formed by extrusion and adapted to be attached to a rear vertical side of the door frame, a front corner portion which is formed by molding to join the upper side portion and the front vertical portion to each other, a rear corner portion which is formed by molding to join the upper side portion and the rear vertical portion to each other; and an ornamental molding portion which is formed by molding and is provided to extend from the rear corner portion towards an outer weather strip attached along a belt line of the vehicle door for attachment to an exterior surface of the door glass.

Therefore, when the door glass is raised and lowered, the glass run for holding a periphery of the door glass holds the door glass to seal the same, and on the rear side of the door glass, the door glass is partly covered with the outer panel of the door frame and the ornamental molding portion, thereby improving the appearance therearound.

The front vertical portion, the upper side portion, the front corner portion, the rear corner portion and the rear vertical portion of the glass run respectively include an outer side wall, a bottom wall, and inner side wall, and define a generally U-shaped cross-section. An outer seal lip extends from an open end of the outer side wall so as to obliquely project in an interior defined by the outer side wall, the inner side wall and the bottom wall, and an inner seal lip extends from an open end of the inner side wall so as to obliquely project in an interior defined by the outer side wall, the inner side wall and the bottom wall, whereby the door glass slides between the outer seal lip and the inner seal lip. And an outer cover lip and an inner cover lip are provided so as to extend from the open end of the outer side wall and the open end of the inner side wall along exterior surfaces thereof. Therefore, a side edge of the door glass is held with the outer seal lip and the inner seal lip, and consequently, the seal between the door frame and the door glass can be effected. Tip ends of the inner panel and the outer panel of the door frame are held with the outer cover lip and the inner cover lip, thereby holding the glass run, and the tip end of the inner panel is covered with the outer cover lip, thereby improving the appearance therearound.

An upper end of the ornamental molding portion is integrally jointed to the rear corner portion upon forming thereof, and a lower part of the ornamental molding portion is tilted so as to be positioned frontwardly of the rear vertical portion. Therefore, as compared with the case in which the ornamental molding portion and the rear corner portion are molded together, a mold adapted to form the rear corner portion can be made small and simple, thereby facilitating the molding thereof, and reducing the production costs. In addition, no gap is produced between the ornamental molding portion and the rear corner portion, thereby improving the appearance therearound.

The ornamental molding portion is formed to be tilted frontwardly of the rear vertical portion to cover the rear side of the door glass. In addition, upon attaching the glass run to the door frame, the tilting angle of the ornamental molding portion about the rear corner portion can be varied separately from that of the rear corner portion, thereby facilitating the attaching work of the glass run to the door frame.

The ornamental molding portion includes a base part for attachment to an outer panel of the door frame, and an ornamental lip part integrally formed with a front side edge of the base part to extend along the base part. The base part and the ornamental lip part hold a tip end of an outer panel of the door frame. Therefore, the ornamental molding portion is securely attached to the outer panel of the door frame such that the ornamental lip part can cover the tip end of the outer panel.

An upper end of the ornamental lip part is formed integrally with the outer cover lip of the rear corner portion, and a lower end thereof contacts the outer weather strip. Therefore, the cover lip can be formed continuously with the outer cover lips of the upper side portion and the rear corner portion, and also continuously with the cover lip of the outer weather strip so that the tip end of the outer panel, which surrounds a periphery of the door glass, can be covered with the cover lip continuously, thereby improving the appearance therearound.

According to a second aspect of the present invention, the ornamental molding portion of the glass run has a seal lip which is extended from an inner side edge of the base part to contact an exterior surface of the door glass.

With this arrangement, the ornamental molding portion has a seal lip which is extended from an inner side edge of the base part to contact an exterior surface of the door glass so that the seal lip can prevent rainwater, etc. from intruding into an interior of the door frame from an exterior surface of the door glass.

According to a third aspect of the present invention, a low friction sliding member is provided in one part of the seal lip, which contacts the door glass.

With this arrangement, since the low friction sliding member is provided in one part of the seal lip, which contacts the door glass, upon raising and lowering the door glass, the door glass slides along the seal lip without generating noises, etc.

According to a fourth aspect of the present invention, the outer panel of the rear side portion of the door frame is extended on an exterior side of the door glass, the tip end of the outer panel is inserted in an attaching recess of the ornamental molding portion, which is defined with the ornamental lip part with a generally L-shaped cross-section and the base part, and is held with an engaging member.

With this arrangement, the outer panel of the rear side portion of the door frame is extended on the exterior side of the door glass to have a generally L-shaped cross-section, the tip end of the outer panel is inserted in the attaching recess of the ornamental molding portion, which is defined with the ornamental lip part with a generally L-shaped cross-section and the base part, and is held with the engaging member. Therefore, the tip end of the outer panel can be held with the ornamental lip part and the base part of the ornamental molding portion, whereby the ornamental molding portion can be securely held, and the tip end of the outer panel can be covered with the ornamental molding portion.

According to a fifth aspect of the present invention, in the lower end of the ornamental molding portion the ornamental lip part thereof curves to define a lower corner, and the lower corner is jointed to an outer side lip of the outer weather strip.

With this arrangement, the ornamental lip part of the lower end of the ornamental molding portion curves to define a lower corner, and the lower corner of the molding portion is jointed to an outer side lip of the outer weather strip. Therefore, the lower corner between the rear vertical portion of the door frame and the door belt line can define an arc-shaped smooth line, thereby improving the appearance therearound.

In accordance with the present invention, the molding portion is formed separately from the remaining portions of the glass run, and is integrally jointed to the rear corner portion upon forming the same. And, the ornamental molding portion is provided to be tilted frontwardly of the rear vertical portion.

Therefore, the mold adapted to form the rear corner portion can be made small and simple, thereby facilitating the molding work, and reducing the production costs. Furthermore, the attaching work of the glass run to the door frame can be readily performed.

The base part and the ornamental lip part of the ornamental molding portion can hold the tip end of the outer panel of the door frame.

The ornamental lip part of the ornamental molding portion is formed such that an upper end thereof is continuous with the outer cover lip of the rear corner portion, and a lower end thereof contacts the outer weather strip. Therefore, the cover lip can be continuously formed from the upper side portion, the rear corner portion and the outer weather strip so that the tip end of the outer panel surrounding the periphery of the door glass can be covered with a continuously provided cover lip, thereby improving the appearance therearound.

Other objects, features, and characteristics of the present invention will become apparent upon consideration of the following description and the appended claims with reference to the accompanying drawings, all of which form a part of this specification.

BRIEF DESCRIPTION OF THE DRAWINGS

FIG. 5(a) is a front view of a rear door to which a further conventional glass run is attached, and FIG. 5(b) is an exploded perspective view of an attaching member for the glass run shown in FIG. 5(a);

DETAILED DESCRIPTION OF THE PREFERRED EMBODIMENTS

One embodiment of the present invention will be explained with reference to FIG. 1, FIG. 6 through FIG. 17.

The present invention will be explained based on one example in which the present invention is applied to a rear door 12b in FIG. 1, but the present invention can be also applied to a front door 12a in FIG. 1.

Figure 1:
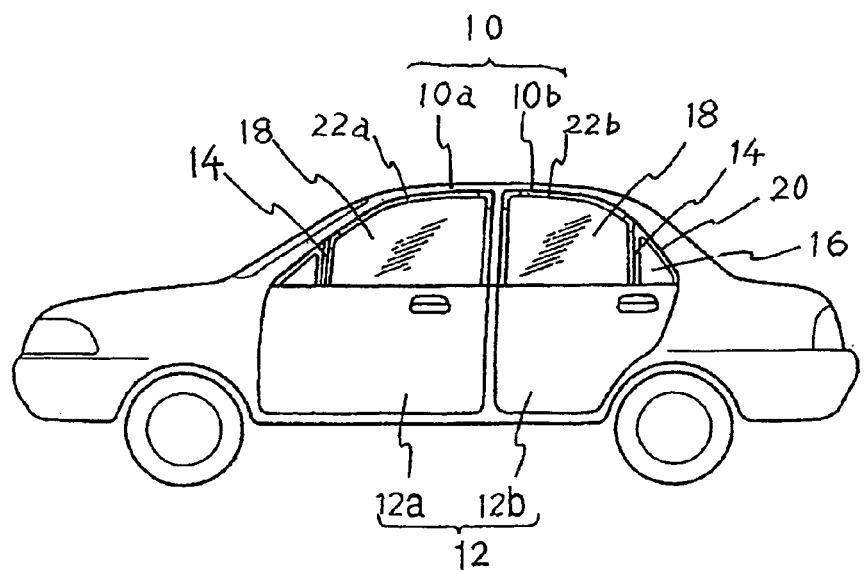
FIG. 1 is a front view of a motor vehicle.
Figure 2:
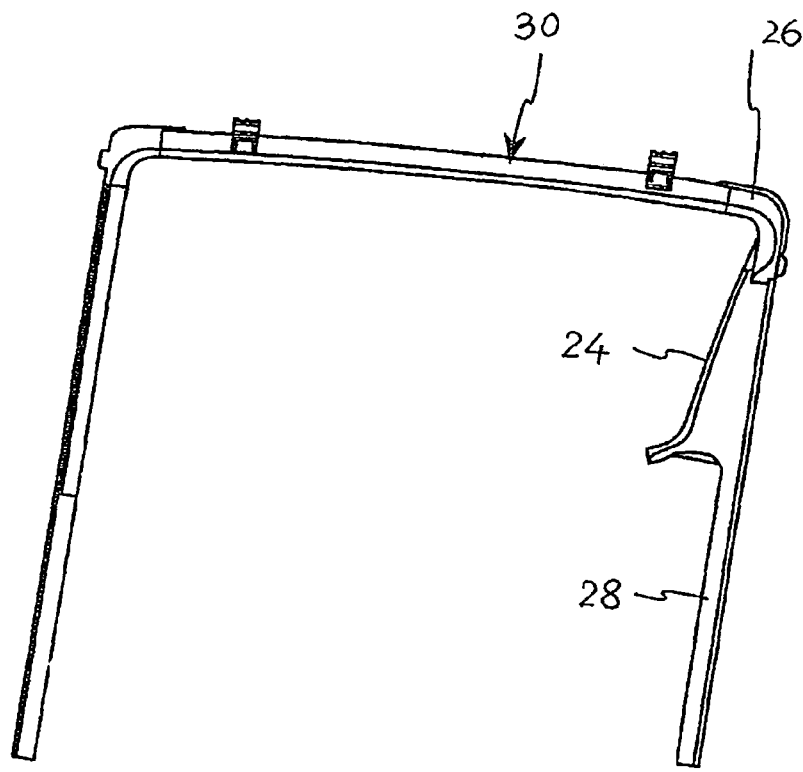
FIG. 2 is a front view of a conventional glass run for attachment to a rear door of the motor vehicle.
Figure 3:
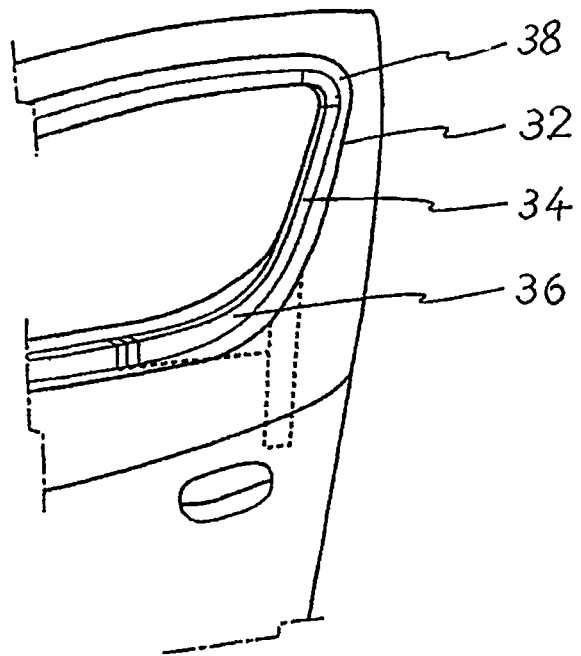
FIG. 3 is a front view of a rear part of a rear door of a motor vehicle, to which another conventional glass run is attached.
Figure 4:
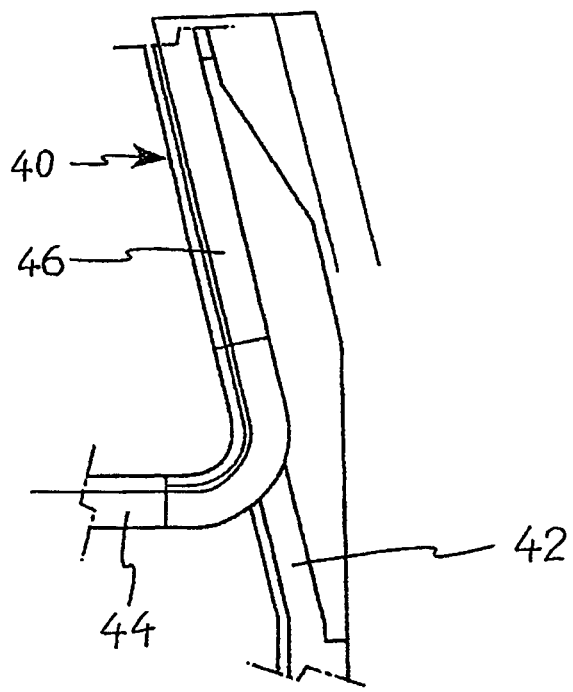
FIG. 4 is a front view of a rear corner of a rear door of a motor vehicle, to which still another conventional glass run is attached.

FIG. 1 is a front view of a conventional door 12 of a motor vehicle. A door glass 18 is respectively provided in a front door 12a and a rear door 12b on an upper side of a belt line thereof so as to be raised and lowered. In the rear door 12b, the door glass 18 is provided on a front side of a division bar 14 so as to be raised and lowered to open and close a window of the rear door 12b, and a quarter door glass 16 is secured to a triangular section defined with a rear portion of the door frame 10b and the division bar 14.

With the present invention, the division bar 14 and the quarter door glass 16 are removed, only the door glass 18 is provided in the rear door 12b.

Figure 6:
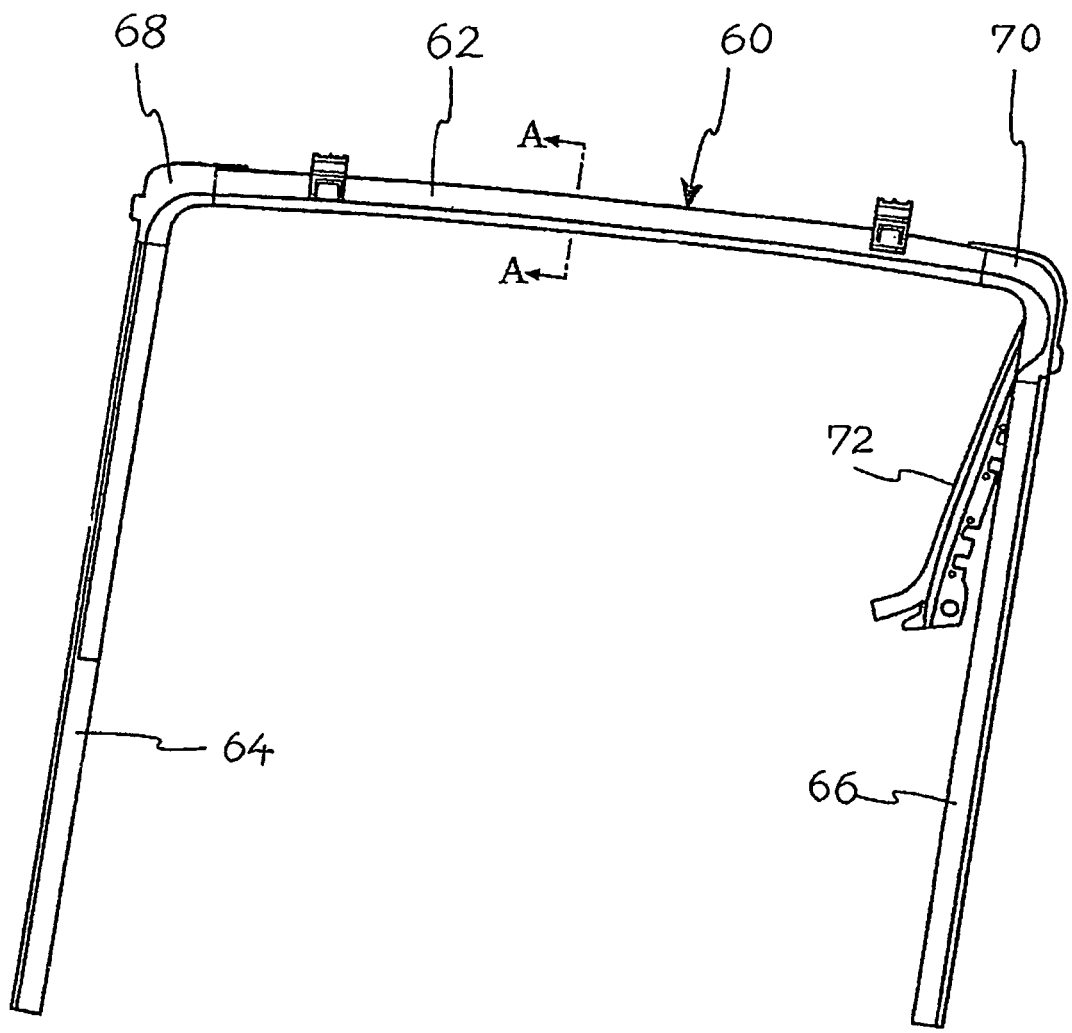
FIG. 6 is a schematic diagram of a glass run in one embodiment of the present invention.

As shown in FIG. 6, a glass run 60 in accordance with the present invention has an upper side portion 62 formed by extrusion for attachment to an upper side of the door frame 10, a front vertical portion 64 formed by extrusion for attachment to a front vertical side of the door frame 10, and a rear vertical portion 66 formed by extrusion for attachment to a rear vertical side of the door frame 10. And, the upper side portion 62, the front vertical portion 64 and the rear vertical portion 66 are respectively formed to have a linear configuration or an approximately linear configuration.

These extruded portions are connected to each other at a front corner and a rear corner by molding, thereby defining corner portions, i.e. a front corner portion 68 formed by molding for connecting the upper side portion 62 and the front vertical portion 64 to each other, and a rear corner portion 70 formed by molding for connecting the upper side portion 62 and the rear vertical portion 66 to each other. By gradually varying the cross-sectional shape of each corner portion, the upper side portion 62, the front vertical portion 64 and the rear vertical portion 66 are connected to each other, though the cross-sectional shapes thereof differ from one another.

In addition, an ornamental molding portion 72 is formed by molding separately from the rear vertical portion 66 so as to extend from the rear corner portion 70 toward a later-described outer weather strip 74 attached to the belt line of a vehicle door for contacting an exterior side of the door glass 18. The ornamental molding portion 72 is formed to protrude from the rear corner portion 70 separately from the rear vertical portion 66 at an angle different from the sliding angle of the door glass 18. The details of the ornamental molding portion 72 will be explained later.

Figure 7:
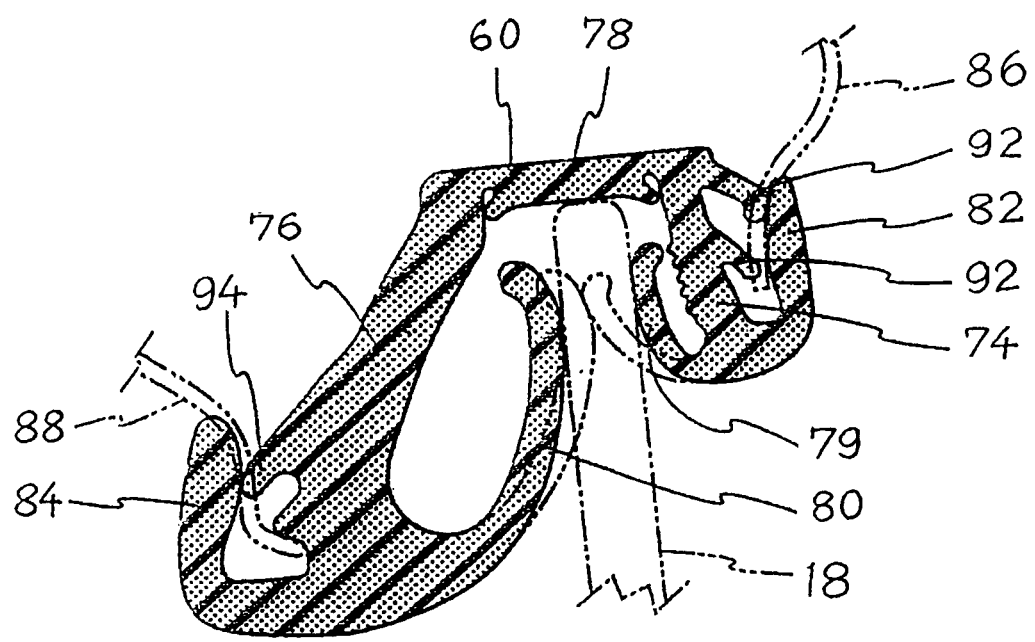
FIG. 7 is cross-sectional view of an upper side portion of a glass run in an embodiment of the present invention, which is taken along line A-A of FIG. 6.

The cross-sectional shapes of the upper side portion 62, the front vertical portion 64 and the rear vertical portion 70 are approximately the same with those of the front corner portion 68 and the rear corner portion 70. The cross-sectional shape of the upper side portion 62 will be explained, for example. As shown in FIG. 7, a main body of the upper side portion 62 has an outer side wall 74, an inner side wall 76 and a bottom wall 78 with a generally U-shaped cross-section.

Figure 8:
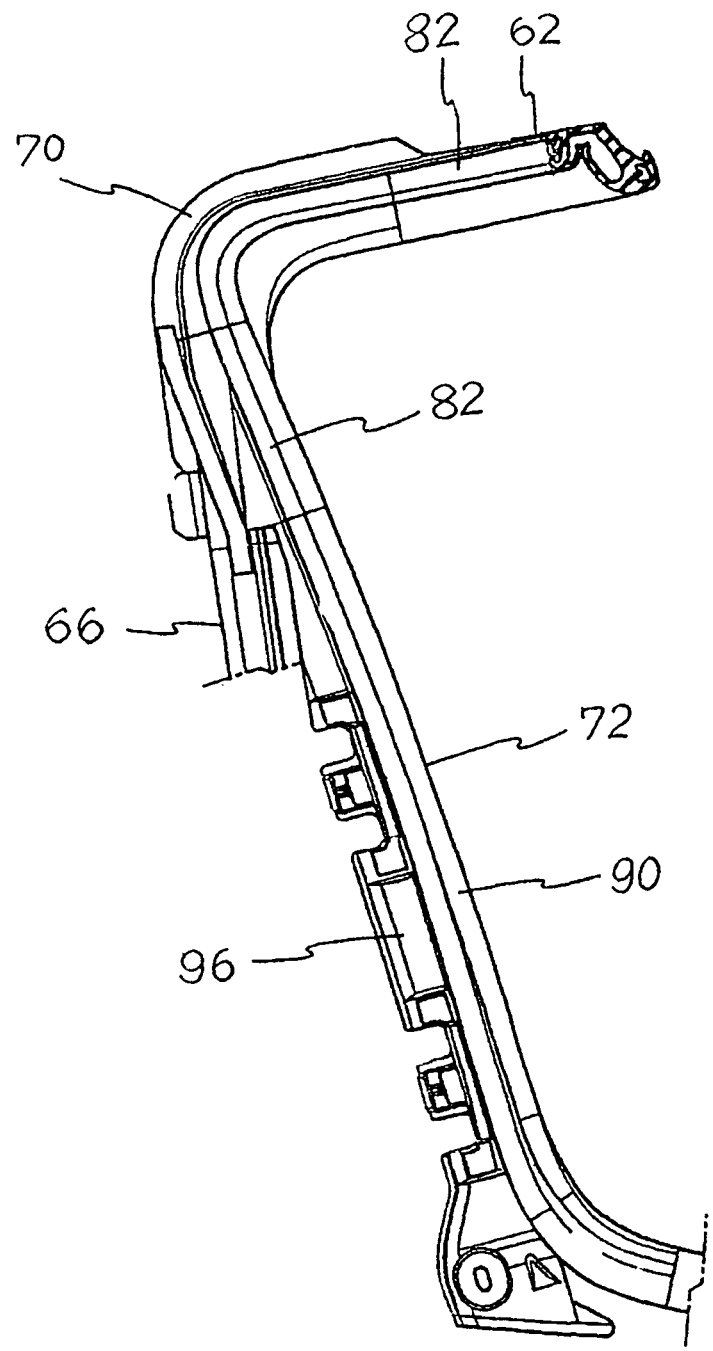
FIG. 8 is a front view of a rear corner portion and an ornamental molding portion of a glass run in one embodiment of the present invention.

An outer seal lip 79 is provided to extend from a tip end of the outer side wall 74 towards an interior of the main body with a generally U-shaped cross-section. As shown in FIGS. 6 through 8, the outer seal lip 79 is continuously formed in the front vertical portion 64, the front corner portion 68, the upper side portion 62, the rear corner portion 70 and the rear vertical portion 66. Therefore, the outer seal lip 79 can continuously seal an exterior surface of the door glass 18, whereby the sealing properties can be effected in the upper side portion 62, the front vertical portion 64, the rear corner portion 70 and the rear vertical portion 66.

Figure 9:
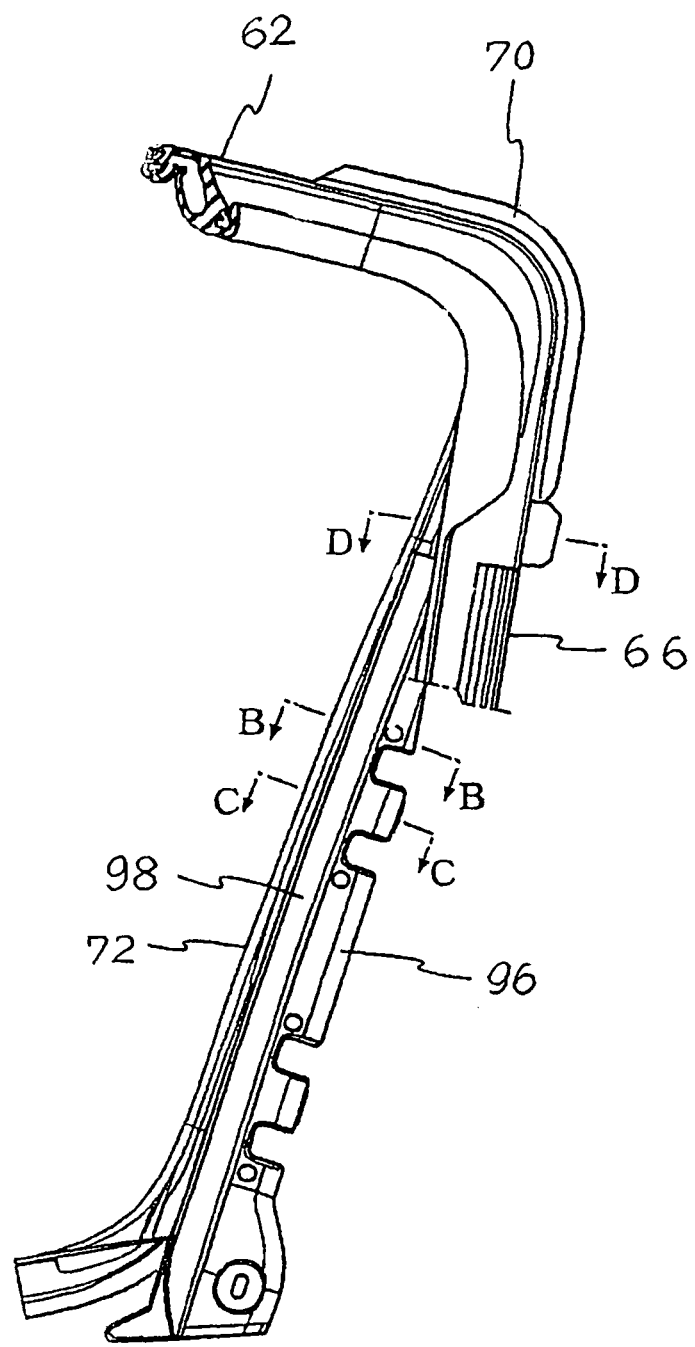
FIG. 9 is a rear view of the rear corner portion and the ornamental molding portion of the glass run in one embodiment of the present invention.

An inner seal lip 80 is provided to extend from a tip end of the inner side wall 76 towards the interior of the main body with a generally U-shaped cross-section, similarly to the outer seal lip 79. As shown in FIG. 9, the inner seal lip 80 is continuously formed in the front vertical portion 64, the front corner portion 68, the upper side portion 62, the front vertical portion 64, the rear corner portion 70 and the rear vertical portion 66. Therefore, the inner seal lip 80 can continuously seal an interior surface of the door glass 18.

And an outer cover lip 82 is provided to extend from the tip end of the outer side wall 74 in a generally parallel relationship with the outer side wall 74 or slightly curving with respect thereto. In addition, an inner cover lip 84 is provided to extend from the tip end of the inner side wall 76 in a generally parallel relationship with the inner side wall 76 or slightly curving with respect thereto. And as shown in FIG. 7, a tip end of an outer panel 88 of the door frame 10 is inserted between the outer side wall 74 and the outer cover lip 82, whereas a tip end of an inner panel 88 of the door frame 10 is inserted between the inner side wall 76 and the inner cover lip 84. The outer cover lip 82 is continuously formed in the front vertical portion 64, the front corner portion 68, the upper side portion 62, the front vertical portion 64, the rear corner portion 70, and a later-described ornamental lip part 90 of the ornamental molding portion 72 without being formed in the rear vertical portion 66.

Outer holding lips 92 are provided to project from an exterior surface of the outer side wall 74 towards an interior surface of the outer cover lip 82. An inner holding lip 94 is provided to project from an exterior surface of the inner side wall 76 towards an interior surface of the inner cover lip 84.

With this arrangement, the outer holding lips 92 of the outer side wall 74, the outer cover lip 82, the inner holding lip 94 of the inner side wall 76, and the inner cover lip 84, respectively hold the tip ends of the outer panel 86 and the inner panel 88 of the door frame 10 strongly to attach the glass run 60 to the door frame 10, whereby the glass run 60 is prevented from coming off the door frame 10, and a tip end of the door frame 10 is covered with the glass run 60, thereby improving the appearance around the tip end of the door frame 10.

In the upper side portion 62 and the front vertical portion 64, the outer cover lip 82 and the inner cover lip 84 are formed large. But in the rear vertical portion 66, the outer cover lip 82 and the inner cover lip 84 are formed small, and they do not hold the tip ends of the outer panel 86 and the inner panel 88.

Both the outer side wall 74 and the outer seal lip 79 are formed smaller than the inner side wall 76 and the inner seal lip 80. Therefore, when the door glass 18 is raised, the door glass 18 can be positioned close to the outer side of the door frame 10, whereby the level difference between the door frame 10 and the door glass 18 can be reduced to make air flow smooth when the vehicle is running, thereby preventing the generation of noises.

Next, the ornamental molding portion 72 will be explained. As shown in FIGS. 8 and 9, the ornamental molding portion 72 is formed by molding separately from the upper side portion 62, the front vertical portion 64 and the rear vertical portion 66. The ornamental molding portion 72 is integrally jointed to the rear corner portion 70 along with the rear vertical portion 66 during the molding of the rear corner portion 70.

The rear vertical portion 66 is provided to extend downwardly along a rear side of the door frame 10 at an identical angle to the sliding angle of the door glass 18 so as to hold a rear side edge of the door glass 18. The ornamental molding portion 72 is provided along the exterior surface of the door glass 18 so as to be tilted frontwardly with respect to the rear vertical portion 66. Therefore, the rear vertical portion 66 and the ornamental molding portion 72 respectively extend from a lower end of the rear corner portion 70 at different angles.

With this arrangement, when the door glass 18 is assembled in the door frame 10, the ornamental molding portion 72 can be flexed along the outer panel 86 away from the rear vertical portion 66 such that the ornamental molding portion 72 is turned about the rear corner portion 70 at a different angle from that of the rear vertical portion 66, thereby facilitating the assembling work of the glass run 60 to the door frame 10. And a rear lower corner of the door glass 18 can be covered with a tip end of the outer panel 86.

As shown in FIGS. 10 through 17, the ornamental molding portion 72 includes a base part 96 for attachment to the outer panel 86 of the door frame 10. An ornamental lip part 90 having an L-shaped cross-section extends from a rear side edge of the base part 96 outwardly and along the base part 96 so as to be integrally formed with the base part 96, and a seal lip 98 extends from an inner side surface of the base part 96 for contacting the exterior surface of the door glass 18.

An attaching recess 100 is defined between the base part 96 and the ornamental lip part 90, and as described later, the tip end of the outer panel 86 is inserted in the attaching recess 100. With this arrangement, the tip end of the outer panel 86 can be held with the ornamental lip part 90 and the base part 96, whereby the ornamental molding portion 72 can be securely held, and the tip end of the outer panel 86 can be covered with the ornamental molding portion 72.

The ornamental lip part 90 is provided such that an upper end thereof is continuous with the outer cover lip 82 of the rear corner portion 70, whereas a lower end thereof contacts an outer weather strip 102. With this arrangement, the ornamental lip part 90 defines a cover lip continuously with the outer cover lip 82 of the front side vertical portion 64, front corner portion 68, the upper side portion 62, and the rear corner portion 70, respectively. In addition, the cover lip can be formed continuously to reach the outer weather strip 102, and consequently, the tip end of the outer panel 86, which extends along a circumference of the door glass 18 can be covered with cover lips with a predetermined width continuously, thereby improving the appearance therearound.

Figure 10:
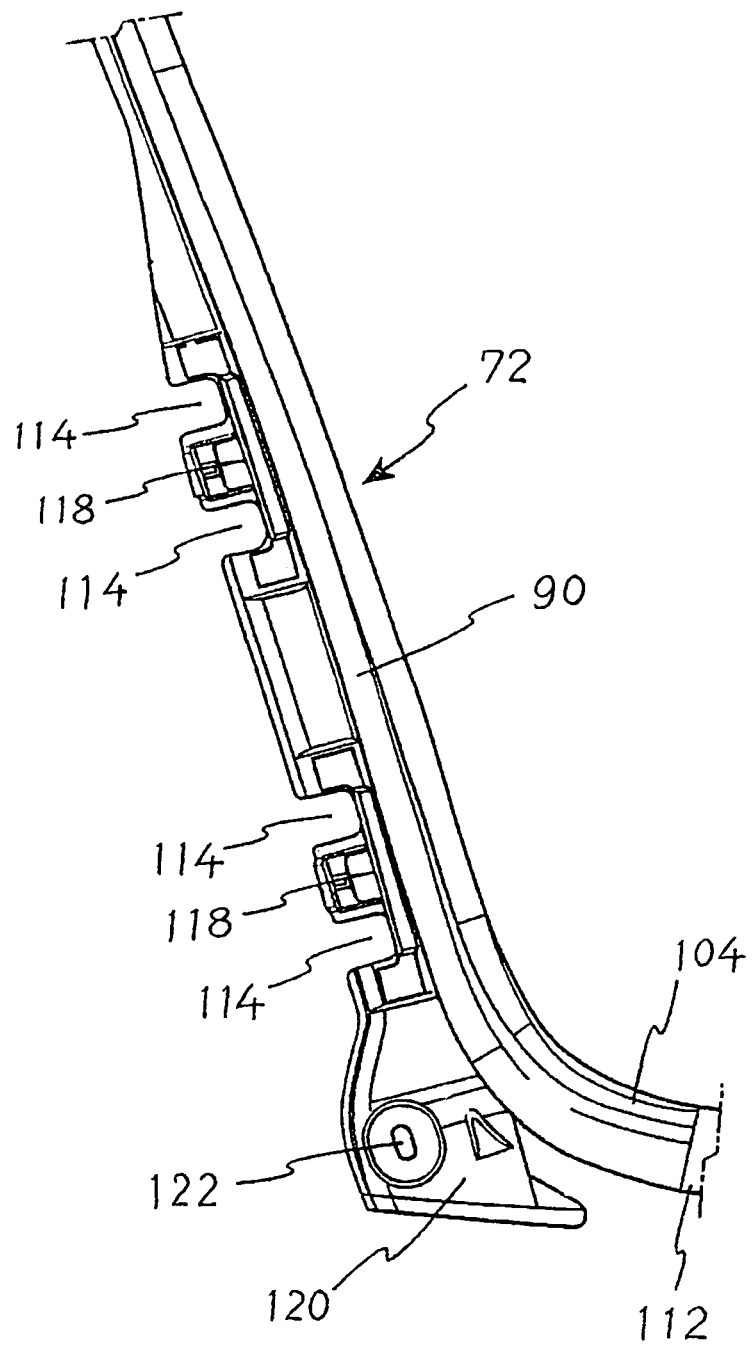
FIG. 10 is a front view of an ornamental molding portion in one embodiment of the present invention.
Figure 11:
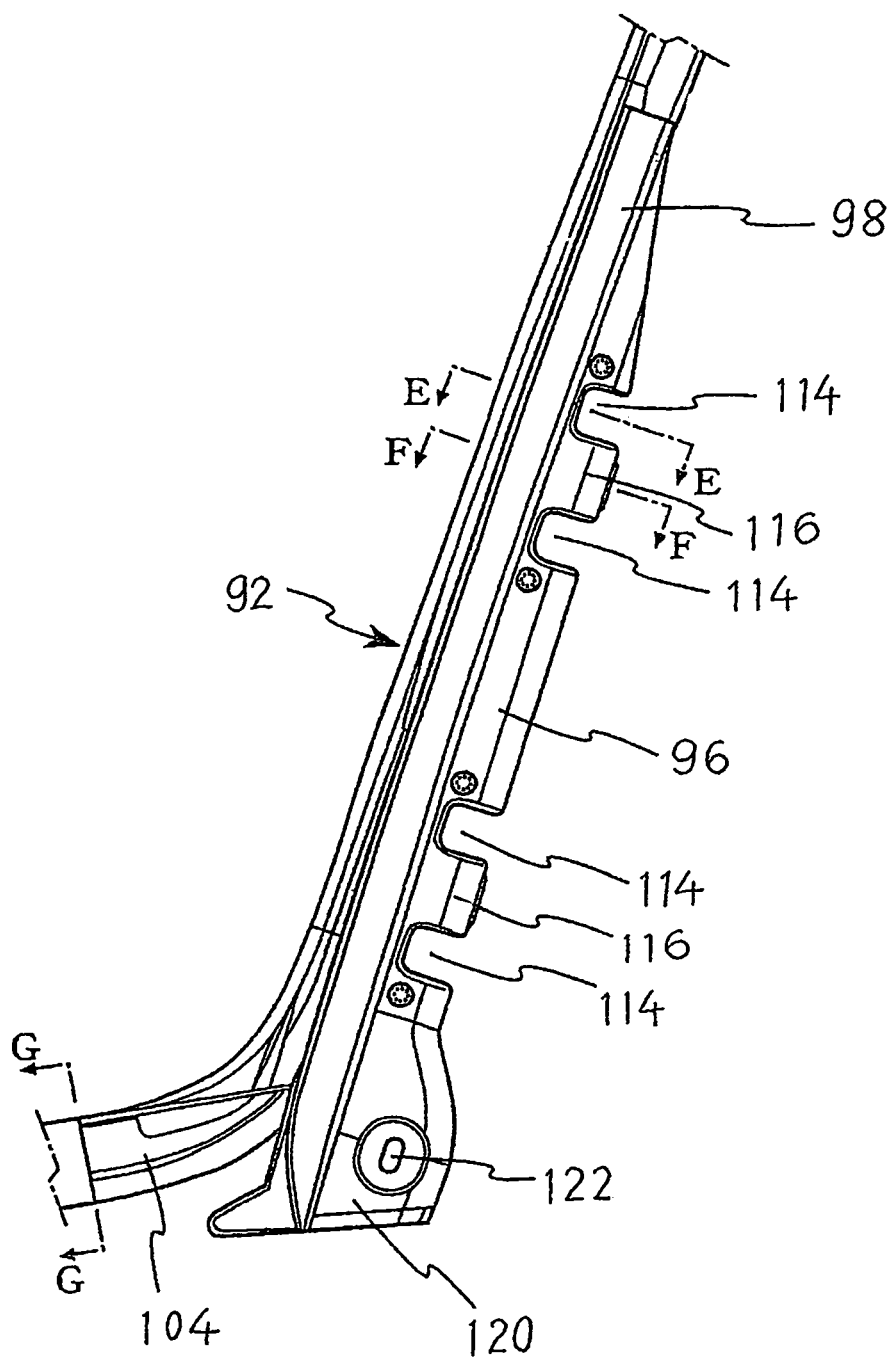
FIG. 11 is a rear view of the ornamental molding portion in one embodiment of the present invention.
Figure 14:
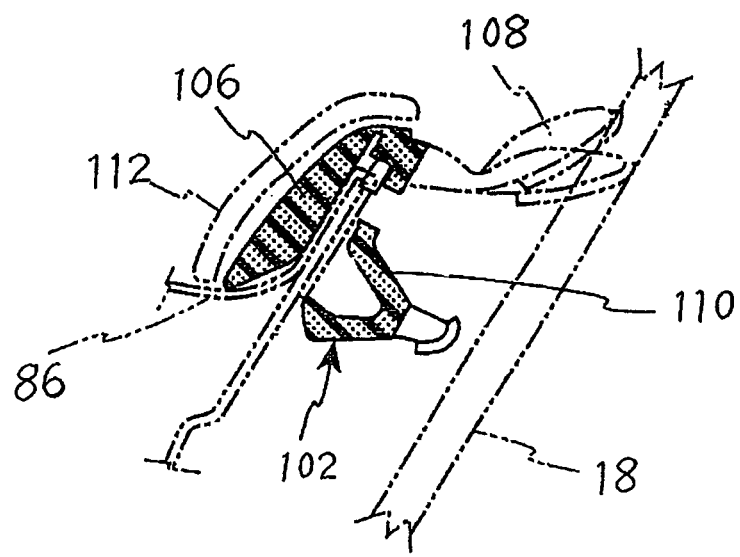
FIG. 14 is a cross-sectional view of the ornamental molding portion in one embodiment of the present invention, which is taken along line G-G of FIG. 11.

As shown in FIG. 10 and FIG. 11, the lower end of the ornamental lip part 90 curves frontwardly to define a lower corner 104, and contacts the outer weather strip 102. As shown in FIG. 14, the outer weather strip 102 includes an outside lip 106 for covering an exterior surface of the outer panel 86, a seal lip 108 extending from an upper end of the outside lip 106 for contacting an exterior surface of the door glass 18 and a base part 110 extending from an upper end of the outside lip 106 downwardly for holding the outer panel 86.

The ornamental lip part 90 in the tip end of the lower corner 104 contacts the outside lip 106 of the outer weather strip 102 and jointed with a cover band 112.

With this arrangement, a corner between the rear vertical portion 66 of the door frame 10 and the belt line of the door 12b can be defined with an arc-shaped smooth line, thereby improving the appearance therearound.

Figure 12:
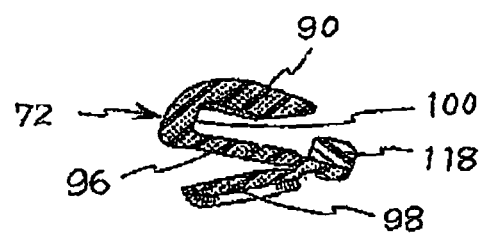
FIG. 12 is a cross-sectional view of the ornamental molding portion in one embodiment of the present invention, which is taken along line E-E of FIG. 11.

As shown in FIG. 10 and FIG. 11, the base part 96 of the ornamental molding portion 72 includes a plurality of notches 114 along a side edge opposite to the side edge along which the ornamental lip part 90 is provided. The cross-sectional shape of the ornamental molding portion 72 in the section defining the notch 114 is shown in FIG. 12. A holding part 116 is provided to extend between the adjacent notches 114. An engaging member 118 composed of a synthetic resin is fitted on the holding part 116 over two notches 114.

A lower end 120 of the base part 96 of the ornamental molding portion 72 is formed to enlarge into a plate-shaped configuration, and a clip hole 122 is defined therein. By inserting a clip into the clip hole 122, the lower end 120 can be attached to a reinforcing panel 124 of the door frame 10.

Figure 13:
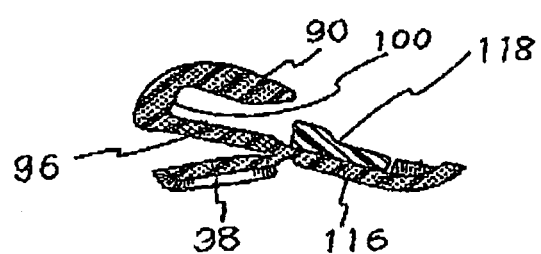
FIG. 13 is a cross-sectional view of the ornamental molding portion in one embodiment of the present invention, which is taken along line F-F of FIG. 11.

As shown in FIGS. 12 and 13, the seal lip 98 is extended from a lower surface of the base part 96 frontwardly to contact the exterior surface of the door glass 18. Therefore, by attaching the base part 96 to the outer panel 86 of the door frame 10, the seal lip 98 can prevent rainwater, etc. from intruding in an interior of the door frame 10 from the exterior surface of the door glass 18.

A low friction sliding member can be provided on a part of the seal lip 98, which contacts the door glass 18. The low friction sliding member may be composed of a flocking of short fibers, a coating of a silicon resin film, a coating of a urethane resin film, etc. In this case, when the door glass 18 is raised, the sliding resistance between the door glass 18 and the seal lip 98 can be reduced, and consequently, the generation of noises, etc. can be prevented.

Hereinafter, the state where the rear vertical portion 66 and the ornamental molding portion 72 of the glass run 60 are attached to the door frame 10 will be explained with reference to FIGS. 15 through 17.

Figure 17:
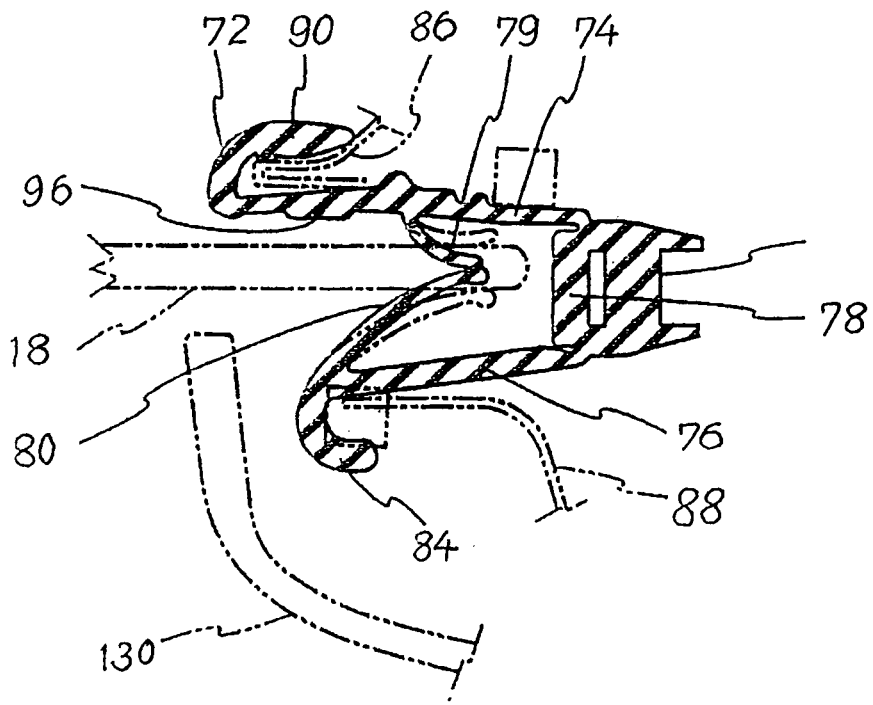
FIG. 17 is a cross-sectional view showing the state where a joint between an ornamental molding portion and a rear vertical side portion of the glass run in one embodiment of the present invention is attached to a door frame, and taken along line D-D of FIG. 9.

FIG. 17 is a cross-sectional view of a part in which the rear vertical portion 66 and the ornamental molding portion 72 are jointed to the rear corner portion 70. In this part, the rear vertical portion 66 and the ornamental molding portion 72 are provided continuously with each other. The outer side wall 74 of the rear vertical portion 66 and the base part 96 of the ornamental molding portion 72 are formed continuously with each other.

Since the outer side wall 74 and the base part 96 are formed continuously with each other, the tip end of the outer panel 86 contacts the base part 96 of the ornamental molding portion 72 continuously with the rear corner portion 70, whereby the tip end of the outer panel 86 can be held therewith. The inner panel 88 is held with the inner side wall 76 and the inner cover lip 84 continuously with the rear corner portion 70.

Figure 15:
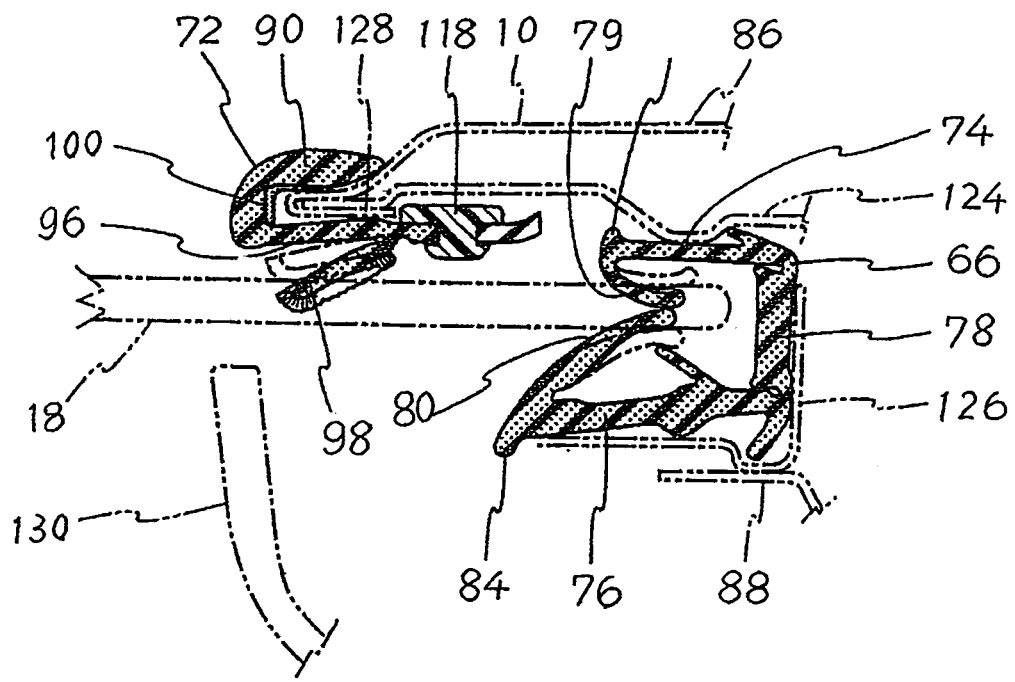
FIG. 15 is a cross-sectional view showing the state where an ornamental molding portion and a rear vertical portion of the glass run in one embodiment of the present invention are attached to a door frame, and taken along line B-B of FIG. 9.
Figure 16:
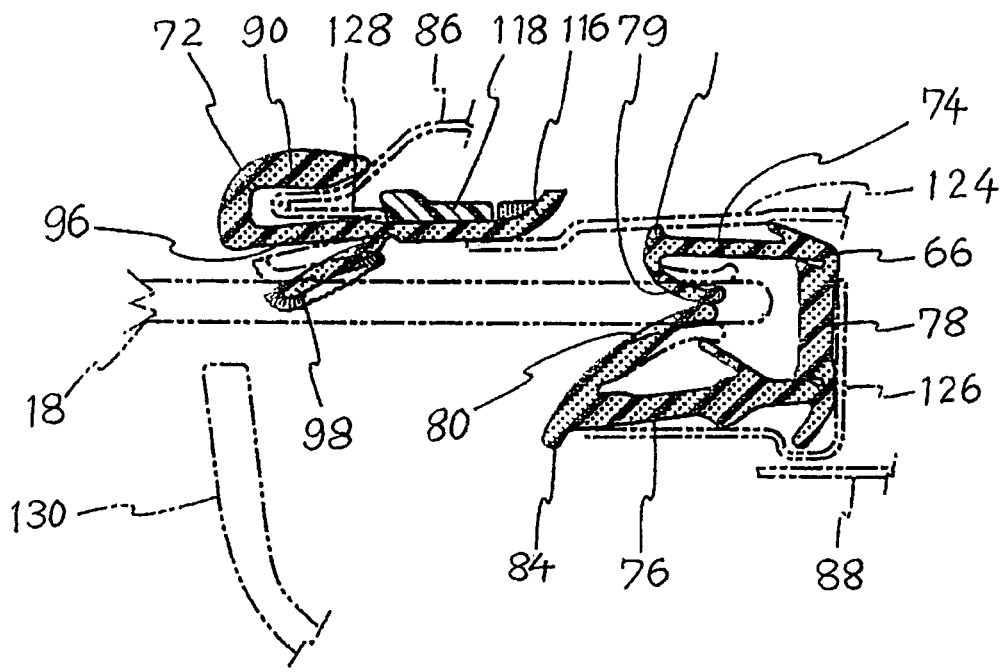
FIG. 16 is a cross-sectional view showing the state where an ornamental molding portion and a rear vertical portion of the glass run in one embodiment of the present invention are attached to a door frame, and taken along line C-C of FIG. 9.

FIG. 15 and FIG. 16 are cross-sectional views of parts in the vicinity of the notch 114 of the ornamental molding portion 72, which are respectively taken along lines B-B and C-C in FIG. 9. In these parts, the rear vertical portion 66 and the ornamental molding portion 72 are attached separately from each other. The rear vertical portion 66 is attached to a retainer 126 secured to the inner panel 88. The inner side wall 76 and the bottom wall 78 are held with the retainer 126, and the outer side wall 74 is held with the reinforcing panel 124.

The tip end of the outer panel 86 of the door frame 10 is bent like a hairpin to define a tip end part 128 for covering a tip end of the reinforcing panel 124. The tip end part 128 is inserted in the attaching recess 100 of the ornamental molding portion 72, whereby the ornamental molding portion 72 is attached to the door frame 10.

A plurality of holding parts 116 are provided between the adjacent notches 114, and are held with the end of the reinforcing panel 124. Therefore, the base part 96 is held with the door frame 10 securely.

The seal lip 98 of the ornamental molding portion 72 contacts the exterior surface of the door glass 18. A garnish 130 is attached inside the door glass 18 for covering the glass run 60 from the interior side thereof to improve the appearance therearound.

Hereinafter, the producing method of the glass run 60 will be explained. First, straight portions of the glass run 60 are formed by extrusion, and then corner portions of the glass run 60 are formed by molding.

The straight portions are composed of a synthetic rubber such as an EPDM rubber, a thermoplastic elastomer such as a polyolefin elastomer, a flexible synthetic resin such as a flexible vinyl chloride, etc.

Where the synthetic rubber is used, after extruded, it is heated for vulcanizing in a vulcanization chamber with a hot air, high frequency wave, etc. Where the thermoplastic elastomer or the flexible synthetic resin is used, it is cooled for solidifying. Then, the resultant material is cut to obtain extruded members, each having a predetermined length.

Next, the front corner portion 68 and the rear corner portion 70 of the glass run 60 are formed by cutting the thus obtained extruded members to predetermined dimensions, placing cut ends of the extruded members in a mold, and injecting a solid material in a cavity of the mold. The molded corner portion has a generally identical cross-section to that of each of the extruded members. It is preferable that the material for the molded corner portion is of the same kind as the material for the extruded members. Where the thermoplastic elastomer or the flexible synthetic resin is used, it is in a molten state when injected into the mold so that the molded portions are integrally welded to the extruded members with heat and pressure thereof.

Where the extruded portions are composed of an EPDM rubber or a polyolefin thermoplastic elastomer, it is preferable to compose the corner portions of the glass run 60 of the polyolefin thermoplastic elastomer. In this case, the extruded portions and the corner portions are composed of the same kind of the materials so that the straight portions and the corner portions of the glass run 60 exhibit good adhesiveness against each other. In addition, they are composed of polyolefin materials so that they exhibit good weather resistance and they can be pulverized at the same time, thereby obtaining readily recyclable products. In the case of the polyolefin thermoplastic resin, vulcanization is not needed so that the production of the glass run is facilitated.

In the case of the synthetic resin, after injected into the mold, the synthetic resin is vulcanized by heating the mold. Since the extruded portions and the molded portions are composed of the same material or the same kind of the materials, vulcanization adhesion can be affected, whereby these portions can be jointed integrally.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run for use in a motor vehicle, which is adapted to be attached along an inner periphery of a door frame of a vehicle door for providing a seal between the door frame and a door glass, comprising:
an upper side portion which is formed by extrusion and adapted to be attached to an upper side of the door frame;
a front vertical portion which is formed by extrusion and adapted to be attached to a front vertical side of the door frame;
a rear vertical portion which is formed by extrusion and adapted to be attached to a rear vertical side of the door frame;
a front corner portion which is formed by molding to join said upper side portion and said front vertical portion to each other;
a rear corner portion which is formed by molding to join said upper side portion and said rear vertical portion to each other; and
an ornamental molding portion which is formed by molding and provided to extend from said rear corner portion towards an outer weather strip attached to a belt line of the vehicle door for attachment on an exterior side of the door glass,
wherein said front vertical portion, said upper side portion, said front corner portion, said rear corner portion and said rear vertical portion respectively include an outer side wall, a bottom wall, and inner side wall, and define a generally U-shaped cross-section, an outer seal lip extends from an open end of said outer side wall so as to obliquely project in an interior defined by said outer side wall, said inner side wall and said bottom wall, an inner seal lip extends from an open end of said inner side wall so as to obliquely project in an interior defined by said outer side wall, said inner side wall and said bottom wall, whereby the door glass slides between said outer seal lip and said inner seal lip, an outer cover lip and an inner cover lip are provided so as to extend from said open end of said outer side wall and said open end of said inner side wall along exterior surfaces of said outer side wall and said inner side wall, respectively, an upper end of said ornamental molding portion is integrally jointed to said rear corner portion during the forming of the rear corner portion, whereas a lower part of said ornamental molding portion extends obliquely from the rear corner portion so as to be positioned frontwardly of said rear vertical portion, said ornamental molding portion includes a base part for attachment to an outer panel of the door frame, and an ornamental lip part integrally formed from a front side edge of said base part to extend along said base part, said base part and said ornamental lip part hold a tip end of an outer panel of the door frame, said ornamental lip part is formed such that an upper end of said ornamental lip part is formed continuously with said outer cover lip of said rear corner portion, and a lower end of said ornamental lip part contacts said outer weather strip.

2. A glass run as claimed in claim 1, wherein said ornamental molding portion has a seal lip which is extended from an inner side surface of said base part to contact an exterior surface of the door glass.

3. A glass run as claimed in claim 2, wherein a low friction sliding member is provided in one part of said seal lip, which contacts the door glass.

4. A glass run as claimed in claim 2, wherein said outer panel of said rear side portion of the door frame is extended on an exterior side of the door glass, said tip end of said outer panel is inserted in an attaching recess of said ornamental molding portion, which is defined with said ornamental lip part with a generally L-shaped cross-section and said base part, and is held with an engaging member.

5. A glass run as claimed in claim 2, wherein said ornamental lip part of said ornamental molding portion curves in said lower end of said ornamental lip part and a lower corner of said ornamental molding portion is jointed to an outer side lip of said outer weather strip.

6. A glass run as claimed in claim 1, wherein a low friction sliding member is provided in one part of said seal lip, which contacts the door glass.

7. A glass run as claimed in claim 6, wherein said outer panel of said rear side portion of the door frame is extended on an exterior side of the door glass, said tip end of said outer panel is inserted in an attaching recess of said ornamental molding portion, which is defined with said ornamental lip part with a generally L-shaped cross-section and said base part, and is held with an engaging member.

8. A glass run as claimed in claim 6, wherein said ornamental lip part of said ornamental molding portion curves in said lower end of said ornamental lip part, and lower corner of said ornamental molding portion is jointed to an outer side lip of said outer weather strip.

9. A glass run as claimed in claim 1, wherein said outer panel of said rear side portion of the door frame is extended on an exterior side of the door glass, said tip end of said outer panel is inserted in an attaching recess of said ornamental molding portion, which is defined with said ornamental lip part with a generally L-shaped cross-section and said base part, and is held with an engaging member.

10. A glass run as claimed in claim 9, wherein said ornamental lip part of said ornamental molding portion curves in said lower end of said ornamental lip part and a lower corner of said ornamental molding portion is jointed to an outer side lip of said outer weather strip.

11. A glass run as claimed in claim 1, wherein said ornamental lip part of said ornamental molding portion curves in said lower end of said ornamental lip part, and a lower corner of said ornamental molding portion is jointed to an outer side lip of said outer weather strip.

12. A glass run as claimed in claim 1, wherein an angle at which the lower part of said ornamental molding portion extends from the rear corner portion is different from an angle at which said rear vertical portion extends from the rear corner portion.

13. A glass run as claimed in claim 1, wherein the lower part of said ornamental molding portion projects from the rear corner portion so as to extend away from said rear vertical portion toward said front vertical portion.

* * * * *